US 010423036B2

(12) United States Patent
Bae et al.

(10) Patent No.: US 10,423,036 B2
(45) Date of Patent: Sep. 24, 2019

(54) DISPLAY DEVICE

(71) Applicant: Samsung Display Co., Ltd., Yongin-si, Gyeonggi-do (KR)

(72) Inventors: Kwang Soo Bae, Suwon-si (KR); Jung Woo Park, Seoul (KR); Jung Suk Bang, Seoul (KR); Min Jeong Oh, Gimpo-si (KR); Hae Ju Yun, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 20 days.

(21) Appl. No.: 15/492,909

(22) Filed: Apr. 20, 2017

(65) Prior Publication Data

US 2017/0315412 A1  Nov. 2, 2017

(30) Foreign Application Priority Data

May 2, 2016  (KR) ........................ 10-2016-0053948

(51) Int. Cl.
*G02F 1/1343* (2006.01)
*G02F 1/1333* (2006.01)
*G02F 1/1341* (2006.01)

(52) U.S. Cl.
CPC ...... *G02F 1/134309* (2013.01); *G02F 1/1341* (2013.01); *G02F 1/133377* (2013.01); *G02F 1/134363* (2013.01); *G02F 2001/134372* (2013.01); *G02F 2201/121* (2013.01); *G02F 2201/123* (2013.01)

(58) Field of Classification Search
CPC ... G02F 1/134363; G02F 2001/134372; G02F 1/133377; G02F 2201/121; G02F 2201/123; G02F 1/134309
See application file for complete search history.

(56) References Cited

U.S. PATENT DOCUMENTS

| 6,466,296 | B1 | 10/2002 | Yamada et al. |
| 7,570,333 | B2 | 8/2009 | Lu et al. |
| 8,018,560 | B2 | 9/2011 | Lu et al. |
| 2008/0074602 | A1* | 3/2008 | Arai ................. G02F 1/134363 349/146 |
| 2013/0313582 | A1* | 11/2013 | Cho ................. G02F 1/133377 257/88 |

FOREIGN PATENT DOCUMENTS

| KR | 10-2004-0012202 A | 2/2004 |
| KR | 10-2015-0122899 A | 11/2015 |

* cited by examiner

*Primary Examiner* — Jessica M Merlin
(74) *Attorney, Agent, or Firm* — Innovation Counsel LLP (57) ABSTRACT

A display device according to an exemplary embodiment includes: a substrate; a thin film transistor; a pixel electrode; a common electrode; an insulation layer disposed between the pixel electrode and the common electrode; a roof layer spaced apart from the pixel electrode with a plurality of microcavities disposed therebetween; and a liquid crystal layer disposed in the microcavities; wherein the pixel electrode includes n branch electrodes that extend parallel with each other, a first connection electrode that connects a first end of a first branch electrode and a first end of a second branch electrode, and a second connection electrode that connects second ends of the n branch electrodes, where the n branch electrodes each has a shape that is bent at least once on a plan view, and the first branch electrode includes a first sub-branch electrode and a second sub-branch that are spaced apart from each other.

14 Claims, 5 Drawing Sheets

DISPLAY DEVICE

RELATED APPLICATIONS

This application claims priority to and the benefit of Korean Patent Application No. 10-2016-0053948 filed in the Korean Intellectual Property Office on May 2, 2016, the entire contents of which are incorporated herein by reference.

BACKGROUND

1. Field

The described technology relates generally to a display device.

2. Description of the Related Art

As one of most commonly used flat display devices, a liquid crystal display device includes two display panels where field generating electrodes such as a pixel electrode, a common electrode, and the like are formed, and a liquid crystal layer provided between the two display panels, wherein the liquid crystal display device generates an electric field in the liquid crystal layer by applying a voltage to the field generating electrodes, determines a direction of liquid crystal molecules of the liquid crystal layer by the electric field, and controls polarization of incident light to thereby display an image.

The two display panels configuring the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two substrates are necessarily used, and respective constituent elements are formed on the two substrates, and as a result, there are problems in that the display device is heavy and thick, has a high cost, and has a long processing time.

The above information disclosed in this Background section is only for enhancement of understanding of the background of the described technology and therefore it may contain information that does not form the prior art that is already known in this country to a person of ordinary skill in the art.

SUMMARY

Exemplary embodiments have been made in an effort to provide a display device manufactured using one substrate to thereby reduce weight, thickness, expense, and processing time thereof.

When the display device is manufactured by using one substrate, a plurality of microcavities that are covered by a roof layer are formed. The plurality of microcavities are disposed apart from each other by column portions of the roof layer.

A pixel electrode may have a shape that is bent once, and accordingly, a data line may also have a shape that is bent in parallel with the pixel electrode. In addition, the column portions of the roof layer may also have a shape that is bent in parallel with the pixel electrode on a plane. In this case, light leakage may occur at the periphery of the column portion of the roof layer.

In order to solve such a problem, the present inventive concept provides a display device that can prevent light leakage.

A display device according to an exemplary embodiment includes: a substrate; a thin film transistor disposed on the substrate; a pixel electrode that is connected to the thin film transistor; a common electrode configured to overlap the pixel electrode; an insulation layer disposed between the pixel electrode and the common electrode; a roof layer spaced apart from the pixel electrode with a plurality of microcavities disposed therebetween; and a liquid crystal layer disposed in the microcavities; wherein the pixel electrode includes n branch electrodes that include a first branch electrode, a second branch electrode, and an n-th branch electrode that extend parallel with each other, a first connection electrode that connects a first end of the first branch electrode and a first end of the second branch electrode, and a second connection electrode that connects second ends of the n branch electrodes, where n is a natural number that is greater than or equal to 3, the n branch electrodes each has a shape that is bent at least once on a plan view, and the first branch electrode includes a first sub-branch electrode and a second sub-branch that are spaced apart from each other.

The display device according to the exemplary embodiment may further include a gate line and a data line that are connected to the thin film transistor, wherein the gate line may extend in a first direction, the data line may extend in a second direction that crosses the first direction, and the n branch electrodes may extend in two directions that form a predetermined angle with respect to the second direction.

The extension direction of the n branch electrodes and the second direction may form an angle between 5 degrees to 10 degrees.

The first direction may be a vertical direction, the second direction is a horizontal direction, and the first direction and the second direction may perpendicularly cross each other.

The n branch electrodes may be symmetrical to each other with reference to an imaginary line.

The imaginary line may be parallel with the first direction.

The n branch electrodes may be bent on the imaginary line.

The first sub-branch electrode and the second sub-branch electrode may be disposed apart from each other on the imaginary line.

The roof layer may include a column portion that covers sides of each microcavity, and the column portion may extend in the second direction on a plane.

The n branch electrodes may further include a third branch electrode, a fourth branch electrode, a fifth branch electrode, a sixth branch electrode, a seventh branch electrode, and an eighth branch electrode, and first ends of the third branch electrode, the fourth branch electrode, the fifth branch electrode, the sixth branch electrode, the seventh branch electrode, and the eighth branch electrode are not connected with each other.

The n branch electrodes may substantially extend in a same direction as date lines extend, and each of the n branch electrodes may have a bent portion at a center except a branch electrode which has a shortest distance from an adjacent data line.

The branch electrode which has a shortest distance from an adjacent data line may be the first branch electrode.

The first sub-branch electrode and the second sub-branch may be spaced apart from each other at the center.

According to the exemplary embodiments, the pixel electrode has a shape that is bent at least once, and the data line and the column portion of the roof layer are formed in parallel with each other along one direction such that occurrence of light leakage at the periphery of the column portion of the roof layer can be prevented.

DETAILED DESCRIPTION

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

The drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Throughout the specification, the word "on" means positioning on or below the object portion, but does not essentially mean positioning on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In this specification, the phrase "a plan view" means a target portion viewed from the top, and the phrase "a cross-section" means a cross-section formed by vertically cutting a target portion and viewed from the side.

Figure 1:
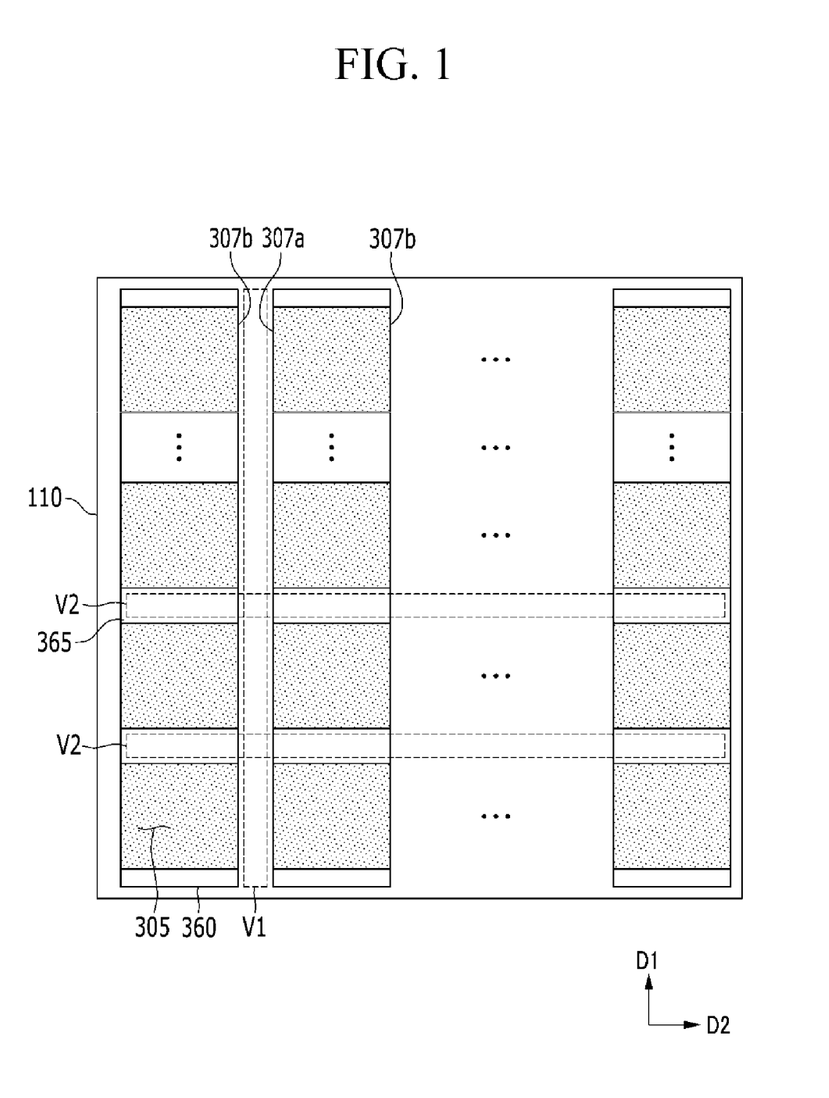
FIG. 1 is a top plan view of a display device according to an exemplary embodiment.

Referring to FIG. 1, a display device according to an exemplary embodiment will be schematically described.

FIG. 1 is a top plan view of a display device according to an exemplary embodiment.

As shown in FIG. 1, a display device according to an exemplary embodiment includes a substrate 110 that is made of a material such as glass or plastic.

A microcavity 305 that is covered by a roof layer 360 is provided on the substrate 110. The roof layer 360 extends in a first direction D1, and a plurality of microcavities 305 are formed under a single roof layer 360. The first direction D1 may be a vertical direction.

The plurality of microcavities 305 may be arranged in a matrix format, and a first area V1 is provided between microcavities 305 that are adjacent to each other in a second direction D2 and a second area V2 is provided between microcavities 305 that are adjacent to each other in the first direction D1. The second direction D2 may cross the first direction D1, and may be a horizontal direction. The first direction D1 and the second direction D2 may perpendicularly cross each other.

The first areas V1 are respectively provided between the plurality of roof layers 360. A side of each microcavity 305 may not be covered by the roof layer 360 in a portion corresponding to the first area V1. The sides that are not covered by the roof layer 360 are called injection holes 307a and 307b.

The injection holes 307a and 307b are provided at opposite edges of each microcavity 305. The injection holes 307a and 307b include a first injection hole 307a and a second injection hole 307b, and the first injection hole 307a exposes a side of a first edge of the microcavity 305 and the second injection hole 307b exposes a second edge of the microcavity 305. The side of the first edge and the side of the second edge of the microcavity 305 face each other.

Each roof layer 360 is formed to be distanced from the substrate 110 between adjacent second areas V2 such that the microcavities 305 are formed. The roof layers 360 cover the sides of the microcavities 305 in the second areas V2. Each roof layer 360 includes a column portion 365, and adjacent microcavities 305 are separated from each other by the column portion 365.

A structure of the display device is exemplarily described in the above exemplary embodiment, but this is not restrictive. The structure of the display device can be variously modified. For example, the alignment of the microcavities 305, the first areas V1, and the second areas V2 can be modified, the plurality of roof layers 360 can be connected with each other in the first area V1, and a part of each roof layer 360 may be formed to be distanced from the substrate 110 in the second area V2 such that adjacent microcavities 305 may be connected with each other.

Hereinafter, a structure of a pixel in the display device according to the exemplary embodiment will be described with reference to FIG. 2 to FIG. 5.

Figure 2:
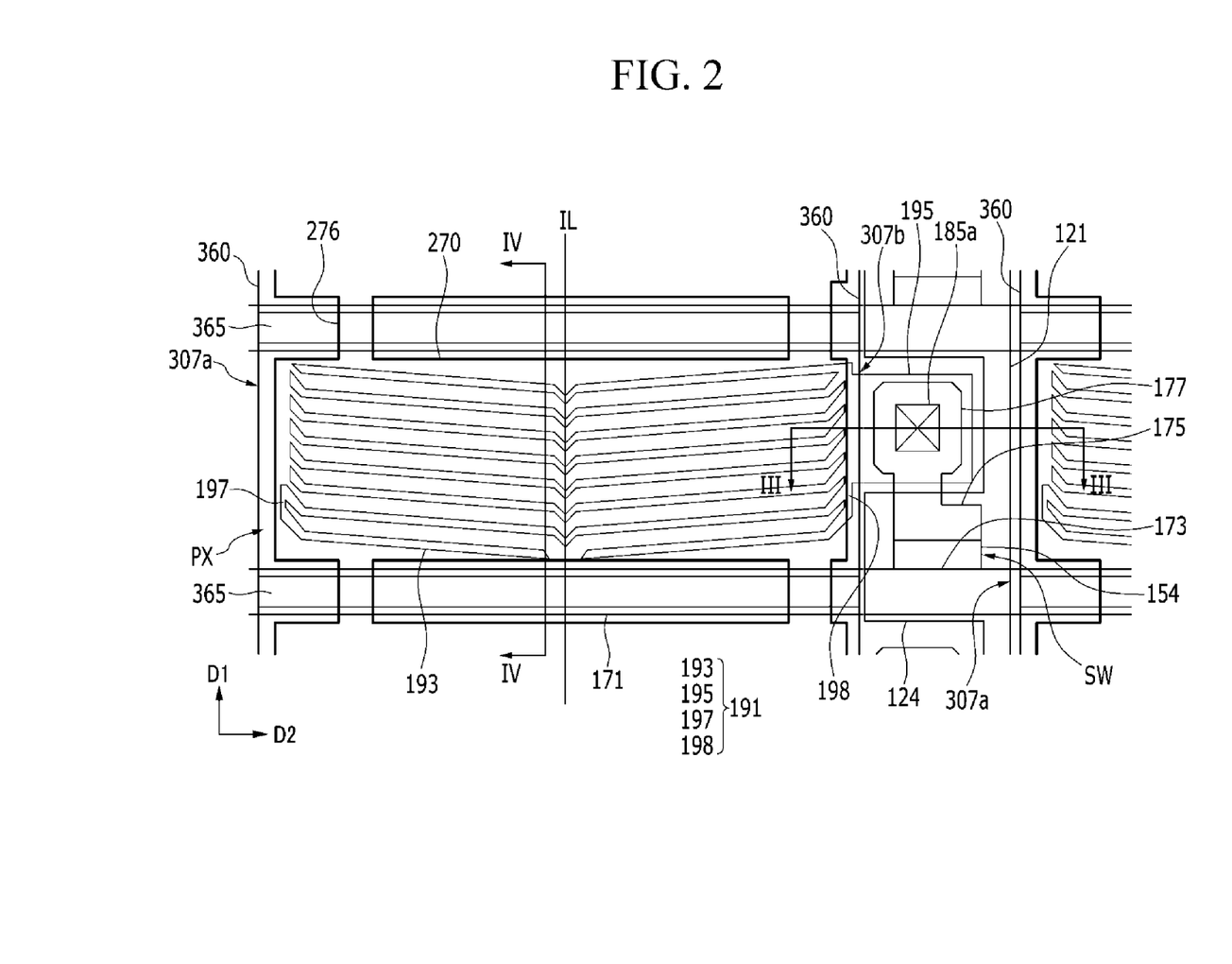
FIG. 2 is a top plan view of a pixel in the display device according to the exemplary embodiment.
Figure 3:
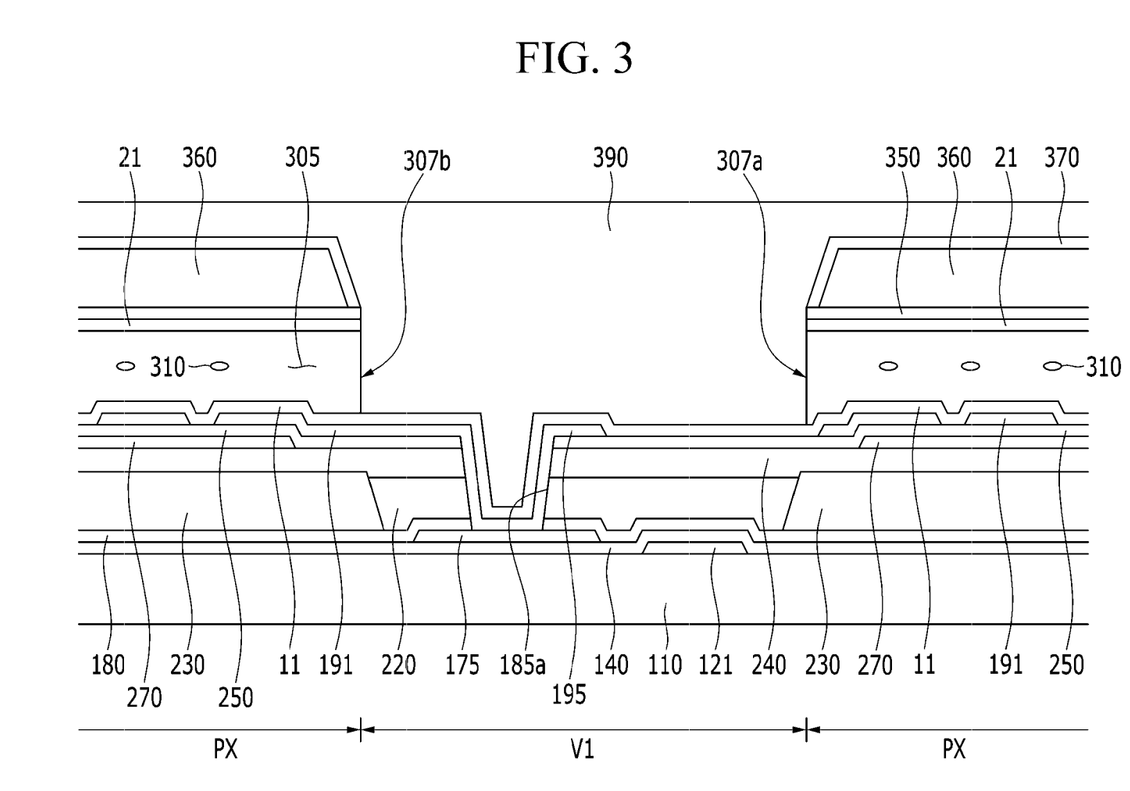
FIG. 3 is a cross-sectional view of FIG. 2, taken along the line III-III.
Figure 4:
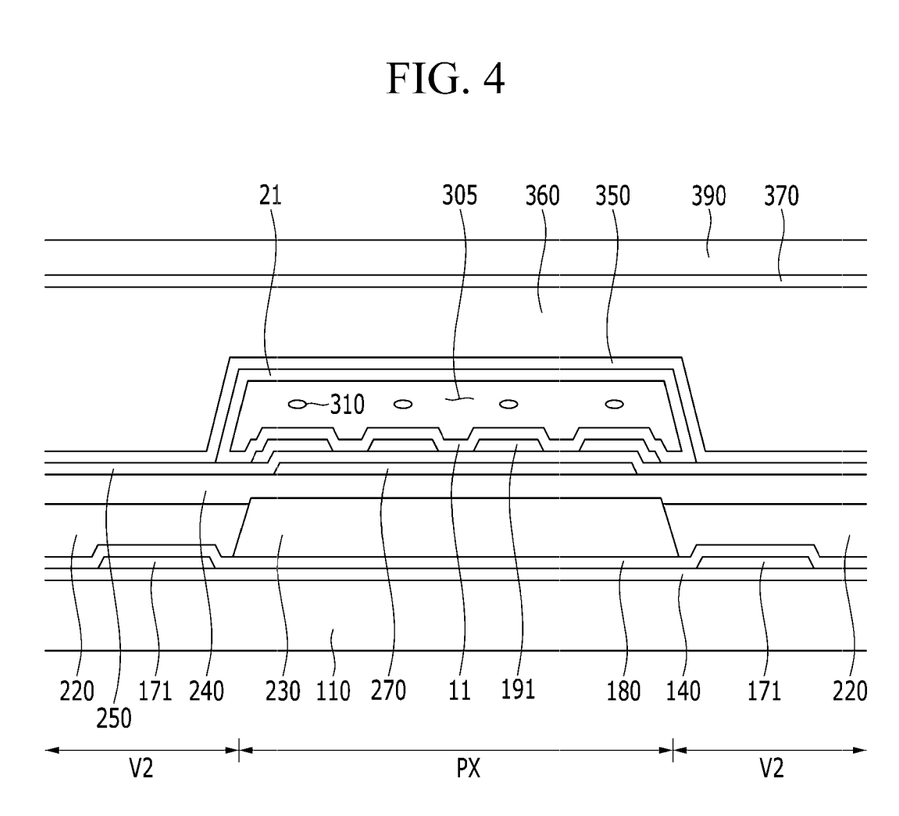
FIG. 4 is a cross-sectional view of FIG. 2, taken along the line IV-IV.
Figure 5:
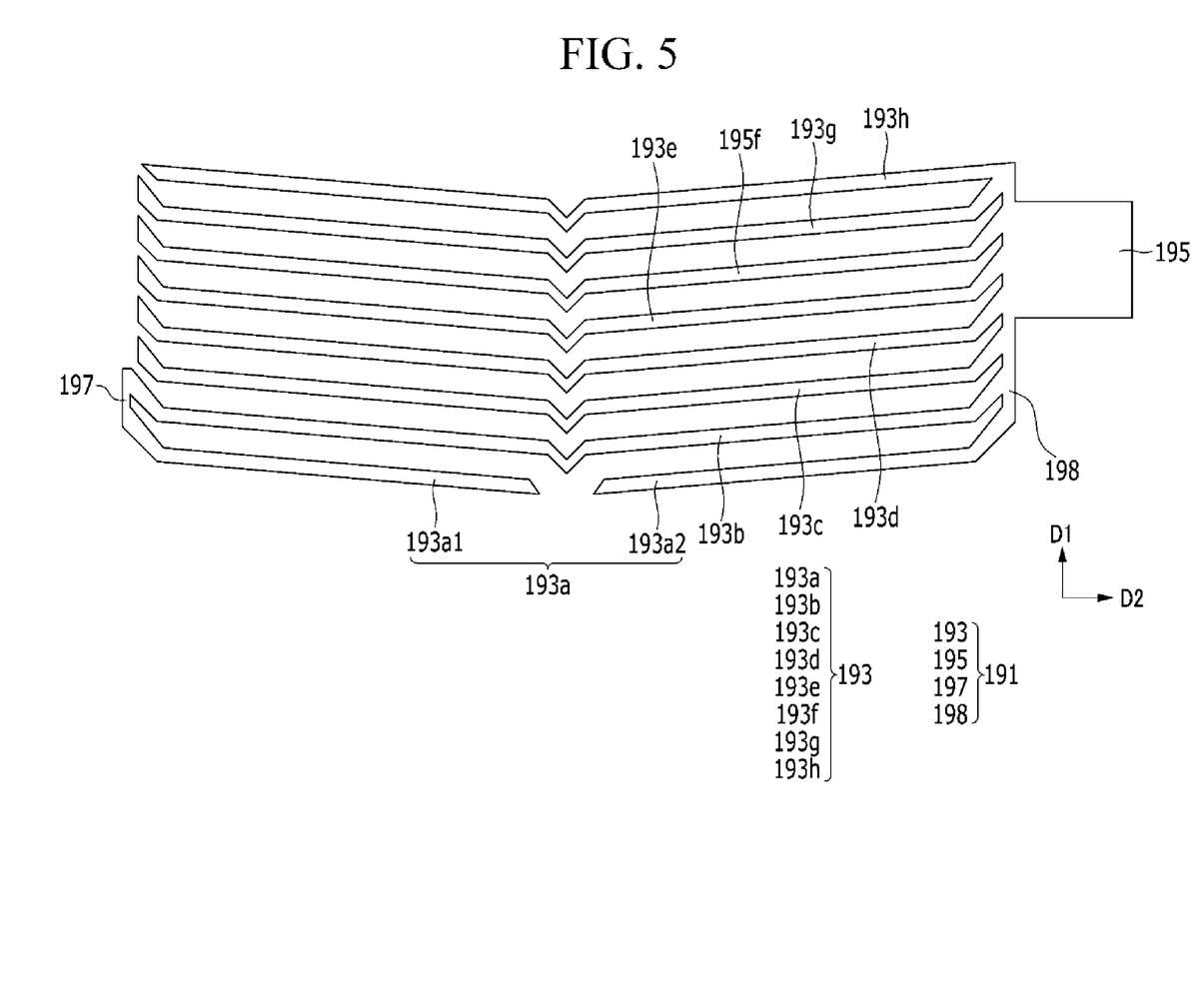
FIG. 5 is a top plan view of a pixel electrode of the display device according to the exemplary embodiment.

FIG. 2 is a top plan view of a pixel of the display device according to the exemplary embodiment, FIG. 3 is a cross-sectional view of FIG. 2, taken along the line III-III, FIG. 4 is a cross-sectional view of FIG. 2, taken along the line IV-IV, and FIG. 5 is a top plan view of a pixel electrode of the display device according to the exemplary embodiment.

Referring to FIG. 2 to FIG. 4, a gate line 121 and a gate electrode 124 that protrudes from the gate line 121 are provided on an insulation substrate 110 that is made of transparent glass or plastic.

The substrate 110 may be made of a transparent and bendable material. In this case, the substrate 110 is bent after a plurality of constituent elements are formed on the substrate 110 such that a curved display device can be formed.

The gate line 121 transmits a gate signal, and may substantially extend in the first direction D1. The gate line 121 may be provided between microcavities 305 that are adjacent to each other in the second direction D2. That is, the gate line 121 is provided in the first area V1.

A gate insulating layer 140 is provided on the gate line 121 and the gate electrode 124. The gate insulating layer 140 may be made of an inorganic insulating material such as a silicon nitride (SiNx), a silicon oxide (SiOx), and the like. In addition, the gate insulating layer 140 may be provided as a single layer or a multilayer.

A semiconductor 154 is provided on the gate insulating layer 140. The semiconductor 154 may overlap the gate electrode 124. The semiconductor 154 may further be provided below a data line 171 as necessary. The semiconductor 154 may be made of amorphous silicon, polycrystalline silicon, a metal oxide, and the like.

An ohmic contact (not shown) may be further provided on the semiconductor 154. The ohmic contact may be made of a material such as n+ hydrogenated amorphous silicon in which an n-type impurity is doped at a high concentration. When the semiconductor 154 is made of the metal oxide, the ohmic contact may be omitted.

The data line 171 and a drain electrode 175 that is distanced from the data line 171 are provided on the semiconductor 154 and the gate insulating layer 140. The data line 171 includes a source electrode 173, and the source electrode 173 and the drain electrode 175 are disposed to face each other.

The data line 171 transmits a data signal, and mainly extends in the second direction D2 such that it crosses the gate line 121. The data line 171 is provided between microcavities 305 that are adjacent to each other in the first direction D1. That is, the data line 171 is provided in the second area V2. The data line 171 may be provided as a straight line and thus is not bent.

As shown in FIG. 2, the source electrode 173 may be placed on the same line as the data line 171 rather than being protruded from the data line 171. The drain electrode 175 may include a bar-shaped portion that substantially extends in parallel with the source electrode 173, and an expansion portion 177 that is provided at the opposite side of the bar-shaped portion.

The gate electrode 124, the source electrode 173, and the drain electrode 175 form one thin film transistor together with the semiconductor 154. The thin film transistor may serve as a switch SW that transmits a data voltage of the data line 171. In this case, a channel of the switch SW is provided in the semiconductor 154 that is provided between the source electrode 173 and the drain electrode 175.

A passivation layer 180 is provided on the data line 171, the source electrode 173, the drain electrode 175, and an exposed portion of the semiconductor 154. The passivation layer 180 may be made of an organic insulating material or an inorganic insulating material, and may be provided as a single layer or a multilayer.

A color filter 230 is provided in each pixel PX on the passivation layer 180.

Each color filter 230 may display one of three primary colors of red, green, and blue. The color filter 230 may also display cyan, magenta, yellow, a white-based color, and the like. The color filter 230 may not be provided in the first area V1 and/or the second area V2.

A light blocking member 220 is provided between every neighboring color filter 230. The light blocking member 220 is provided on a boundary between pixels PX and the switch SW to prevent light leakage. That is, the light blocking member 220 may be provided in the first areas V1 and the second areas V2. However, the present inventive concept is not limited thereto, and the light blocking member 220 may be provided only in the first areas V1 and not in the second areas V2. In this case, the color filters 30 in the adjacent pixels PX may overlap each other in the second area V2 such that light leakage can be prevented. The color filter 230 and the light blocking member 220 may overlap each other in some areas.

A first insulation layer 240 may be further provided on the color filter 230 and the light blocking member 220. The first insulation layer 240 may be made of an organic insulating material, and may serve to planarize upper surfaces of the color filter 230 and the light blocking member 220. The first insulation layer 240 may be provided as a double layer that is formed of a layer made of an organic insulating material and a layer made of an inorganic insulating material. Alternatively, the first insulation layer 240 may be omitted as necessary.

A common electrode 270 is provided on the first insulation layer 240. Common electrodes 270 provided in the plurality of pixels PX are connected with each other through a connection bridge 276 and the like such that they can transmit substantially the same voltage. The common electrode 270 provided in each pixel PX may have a planar shape. The common electrode 270 may be provided as a transparent metal oxide such as indium-tin oxide (ITO), indium-zinc-oxide (IZO), and the like.

The common electrode 270 may receive a common voltage. The common voltage may be a constant voltage.

A second insulation layer 250 is provided on the common electrode 270. The second insulation layer 250 may be provided as an inorganic insulating layer such as a silicon nitride (SiNx), a silicon oxide (SiOx), and the like.

A contact hole 185a that exposes a part of the drain electrode 175, for example, the expansion portion 177, is provided in the passivation layer 180, the light blocking member 220, the first insulation layer 240, and the second insulation layer 250.

A pixel electrode 191 is provided on the second insulation layer 250. The pixel electrode 191 may be made of a transparent metal oxide such as indium tin oxide (ITO), indium zinc oxide (IZO), and the like. The pixel electrode 191 overlaps the common electrode 270. The pixel electrode 191 and the common electrode 270 are separated from each other by the second insulation layer 250. The second insulation layer 250 insulates the pixel electrode 191 and the common electrode 270 from each other.

The pixel electrode 191 includes a plurality of branch electrodes 193, first and second connection electrodes 197 and 198 that connect the plurality of branch electrodes 193, and an expansion portion 195 that is expanded from the second connection electrode 198 and overlaps the switch SW. The pixel electrode 191 is illustrated in FIG. 5.

The plurality of branch electrodes 193 extend in parallel with each other. The plurality of branch electrodes 193 extend in two directions that are similar to the second direction while forming a predetermined angle with respect to the second direction D2. The extension directions of the plurality of branch electrodes 193 and the second direction D2 form an angle of about 5 to 10 degrees. The plurality of branch electrodes 193 are substantially symmetrical to each other with reference to an imaginary line IL. The imaginary line IL may be parallel with the first direction D1, and may be formed in the center of the pixels PX. The plurality of branch electrodes 193 are bent on the imaginary line IL. As shown in FIG. 2 and FIG. 5, the plurality of branch electrodes 193 may be bent once more at opposite end of the branch electrodes 193 that are far off the imaginary line IL.

Referring to FIG. 5, the plurality of branch electrodes 193 may include a first branch electrode 193a, a second branch electrode 193b, a third branch electrode 193c, a fourth branch electrode 193d, a fifth branch electrode 193e, a sixth branch electrode 193f, a seventh branch electrode 193g, and an eighth branch electrode 193h. In FIG. 2 and FIG. 5, the pixel electrode 191 includes 8 branch electrodes 193, but the present inventive concept is not restrictive. The pixel electrode 191 may include 8 or fewer branch electrodes 193 or may include 8 or more branch electrodes.

The first branch electrode 193a includes a first sub-branch electrode 193a1 and a second sub-branch electrode 193a2. The first sub-branch electrode 193a1 and the second sub-branch electrode 193a2 are spaced apart from each other on the imaginary line IL.

The first connection electrode 197 connects the first branch electrode 193a and the second branch electrode 193b to each other. Particularly, the first connection electrode 197 may connect a first end of the first branch electrode 193a and a first end of the second branch electrode 193b to each other. In this case, the first end may be a left end. The first connection electrode 197 connects a first sub-branch electrode 193a1 and a second branch electrode 193b to each other. Ends of the third branch electrode 193c, the fourth branch electrode 193d, the fifth branch electrode 193e, the sixth branch electrode 193f, the seventh branch electrode 193g, and the eighth branch electrode 193h may not be respectively connected to each other at the first end of the third branch electrode 193c, the fourth branch electrode 193d, the fifth branch electrode 193e, the sixth branch electrode 193f, the seventh branch electrode 193g, and the eighth branch electrode 193h.

The second connection electrode 198 connects the plurality of branch electrodes 193. Particularly, the second connection electrode 198 may connect second ends of the plurality of branch electrodes 193 to each other. In this case, the second end may be a right end. The second connection electrode 198 connects the second sub-branch electrode 193a2, the second branch electrode 193b, the third branch electrode 193c, the fourth branch electrode 193d, the fifth branch electrode 193e, the sixth branch electrode 193f, the seventh branch electrode 193g, and the eighth branch electrode 193h to each other.

The expansion portion 195 is connected with the second connection electrode 198, and overlaps the drain electrode 175. Particularly, the expansion portion 195 of the pixel electrode 191 may overlap the expansion portion 177 of the drain electrode 175. The expansion portion 195 of the pixel electrode 191 is physically and electrically connected with the drain electrode 195 through the contact hole 185a and thus receives a voltage from the drain electrode 175.

A data voltage is applied to the pixel electrode 191. The data voltage is transmitted to the pixel electrode 191 through the data line 171 when the switch SW is in the turn-on state.

The layout form of the pixel, the structure of the thin film transistor, the shape of the pixel electrode, and the location and the shape of the common electrode described above are just exemplified, and the present inventive concept is not limited thereto and may be variously modified. In addition, stacking sequences of the pixel electrode 191 and the common electrode 270 may be changed with each other. That is, in the above description, the second insulation layer 250 is provided on the common electrode 270 and the pixel electrode 191 is provided on the second insulation layer 250, but on the contrary, the insulation layer may be provided on the pixel electrode and the common electrode may be provided on the insulation layer. In addition, the pixel electrode 191 may have a planar shape and the common electrode 270 may include branch electrodes.

The microcavities 305 that are covered by the roof layers 360 are provided on the pixel electrodes 191. The microcavities 305 are surrounded by the pixel electrodes 191 and the roof layers 360. The plurality of microcavities 305 are provided on the substrate 110 and one microcavity 305 corresponds to one pixel in the drawing. However, the present inventive concept is not limited thereto. A single microcavity 305 may correspond to a plurality of pixels or may correspond to a part of the pixel. A size of the microcavity 305 may be variously modified depending on a size and a resolution of the display device.

The roof layer 360 may be made of an organic material. The roof layer 360 extends in the first direction D1 in a plan view, and is provided on the microcavity 305 and the second area V2. The roof layer 360 covers an upper surface and a part of side of the microcavity 305. The roof layer 360 is hardened through a curing process so that it can maintain the shape of the microcavity 305. The roof layer 360 is spaced apart from the pixel electrode 191, interposing the microcavity 305 therebetween.

The roof layer 360 includes a column portion 365, and the column portion 365 covers a part of the side of the microcavity 305. The microcavities 305 that are adjacent to each other along the first direction D1 are separated from each other by the column portion 365. The column portion 365 extends along the second direction D2 in a plan view. The column portion 365 overlaps the data line 171, and extends in a direction that is parallel with the data line 171. Like the data line 171, the column portion 365 is provided as a straight line in a plan view and is not bent.

In the present exemplary embodiment, the pixel electrode 191 is bent at least once, and the data line 171, the roof layer 360, and the column portion 365 are provided as straight lines. Since the column portion 365 of the roof layer 360 is provided as a straight line, the planar shape of the microcavity 305 may have an approximate quadrangular shape. When the column portion 365 of the roof layer 360 has a bent portion on a plane, light leakage may occur. In the present exemplary embodiment, the column portion 365 of the roof layer 360 is provided as a straight line, and therefore occurrence of light leakage at the periphery of the column portion 365 of the roof layer 360 can be prevented.

In the present exemplary embodiment, the pixel electrode 191 has a bent shape and the data line 171 has a straight line shape. When the first sub-branch electrode 193a1 and the second sub-branch electrode 193a2 of the first branch electrode 193a of the pixel electrode 191 at the imaginary line IL are connected to each other, the first branch electrode 193a may overlap the data line 171. Accordingly, a pixel PX that is adjacent to the first branch electrode 193a may be electrically affected by the data voltage applied to the first branch electrode 193a. In the present exemplary embodiment, the first sub-branch electrode 193a1 and the second sub-branch electrode 193a2 of the first branch electrode 193a are set to be spaced apart from each other so as to prevent the first branch electrode 193a from overlapping the pixel electrode 191. Accordingly, the adjacent pixel PX can be prevented from being electrically affected.

In this case, second ends of the second sub-branch electrode 193a2 of the first branch electrode 193a, the second branch electrode 193b, the third branch electrode 193c, the fourth branch electrode 193d, the fifth branch electrode 193e, the sixth branch electrode 193f, the seventh branch electrode 193g, and the eighth branch electrode 193h are connected to each other by the second connection electrode 198, and the second connection electrode 198 is connected with the expansion portion 195 and thus the second connection electrode 198 can receive the data voltage from the drain electrode 175.

The first sub-branch electrode 193a1 and the second sub-branch electrode 193a2 of the first branch electrode 193a are not connected with each other. The first sub-branch electrode 193a1 is connected with the second branch electrode 193b by the first connection electrode 197 and thus receives the data voltage from the drain electrode 175.

The roof layer 360 does not cover a part of each of edge sides of the microcavity 305, and portions that are not covered by the roof layer 360 are called injection holes 307a and 307b. The injection holes 307a and 307b include a first injection hole 307a that exposes a first edge side of the microcavity 305 and a second injection hole 307b that exposes a second edge side of the microcavity 305. The first edge and the second edge face each other, and for example, the first edge may be the left edge of the microcavity 305 and the second edge may be the right edge of the microcavity in the top plan view of FIG. 1. In a manufacturing process of the display device, the injection holes 307a and 307b are exposed, and accordingly, an aligning agent or a liquid crystal material can be injected into the microcavity 305 through the injection holes 307a and 307b.

Alignment layers 11 and 21 are respectively provided above the pixel electrode 191 and below the roof layer 360.

The alignment layers 11 and 21 include a first alignment layer 11 and a second alignment layer 21. The first alignment layer 11 and the second alignment layer 21 may be provided as horizontal alignment layers, and may be made of an aligning material such as polyamic acid, polysiloxane, polyimide, and the like. The first and second alignment layers 11 and 21 may be connected with each other at a side wall of the microcavity 305.

The first alignment layer 11 is provided above the pixel electrode 191. The first alignment layer 11 may be provided above the second insulating layer 240, which is not covered by the pixel electrode 191. Further, the first alignment layer 11 may be provided in the first area V1.

The second alignment layer 21 is provided below the roof layer 360 such that it faces the first alignment layer 11.

A liquid crystal layer formed of liquid crystal molecules 310 is provided in the microcavity 305 provided between the pixel electrode 191 and the roof layer 360. The liquid crystal molecules 310 may have negative dielectric anisotropy or positive dielectric anisotropy. A long-axis direction of the liquid crystal molecules 310 of the liquid crystal layer 3 are disposed in parallel to the substrate 110 while the electric field is not applied. That is, the liquid crystal molecules 310 may be horizontally aligned.

The pixel electrode 191 supplied with the data voltage through the switch SW generates an electric field together with the common electrode 270 that is supplied with a common voltage such that an alignment direction of the liquid crystal molecules 310 of the liquid crystal layer 3 in the microcavity 305 can be determined. Particularly, the branch electrode 193 of the pixel electrode 191 forms a fringe field in the liquid crystal layer together with the common electrode 270 such that the alignment direction of the liquid crystal molecules 310 can be determined. Luminance of light passing through the liquid crystal layer is changed depending on the determined alignment direction of the liquid crystal molecules 310 such that an image is displayed on a screen.

A third insulation layer 350 may further be provided under the roof layer 360. The third insulation layer 350 is provided between the second alignment layer 21 and the roof layer 360. The third insulation layer 350 may be made of an inorganic insulating material such as a silicon nitride (SiNx), a silicon oxide (SiOx), and the like. The third insulation layer 350 may be omitted as necessary.

A fourth insulation layer 370 may be further provided on the roof layer 360. The fourth insulation layer 370 may be made of an inorganic insulating material such as a silicon nitride (SiNx), a silicon oxide (SiOx), and the like. The fourth insulation layer 370 may cover an upper surface and/or side surfaces of the roof layer 360. The fourth insulation layer 370 serves to protect the roof layer 360 that is made of an organic material. The fourth insulation layer 370 may be omitted as necessary.

An encapsulation layer 390 is provided on the fourth insulation layer 370. The encapsulation layer 390 covers the injection holes 307a and 307b through which the microcavity 305 is partially exposed to the outside. That is, the encapsulation layer 390 seals the microcavity 305 to prevent the liquid crystal molecules 310 in the microcavity 305 from being discharged to the outside. The encapsulation layer 390 contacts the liquid crystal molecules 310, and therefore it is preferably to be made of a material that does not react with the liquid crystal molecules 310. For example, the encapsulation layer 390 may be made of parylene.

The encapsulation layer 390 may be provided as a multilayer such as double layer and a triple layer. The double layer is configured by two layers made of different materials. The triple layer is configured by three layers, and materials of adjacent layers are different from each other. For example, the encapsulation layer 390 may include a layer made of an organic insulating material and a layer made of an inorganic insulating material.

Although not illustrated, polarizers may be further formed on upper and lower surfaces of the display device. The polarizers may be constituted by a first polarizer and a second polarizer. The first polarizer may be attached to the lower surface of the substrate 110, and the second polarizer may be attached to the encapsulation layer 390.

While this disclosure has been described in connection with what is presently considered to be practical example embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
    a substrate;
    a thin film transistor disposed on the substrate;
    a pixel electrode connected to the thin film transistor;
    a common electrode configured to overlap the pixel electrode;
    an insulation layer disposed between the pixel electrode and the common electrode;
    a roof layer spaced apart from the pixel electrode with a microcavity disposed therebetween; and
    a liquid crystal layer disposed in the microcavity,
    wherein the pixel electrode comprises:
    branch electrodes that include a first branch electrode including a first sub-branch electrode and a second sub-branch electrode spaced apart from each other to have a disconnection portion, a second branch electrode adjacent to the first branch electrode and not having a disconnection portion, and a third branch electrode adjacent to the second branch electrode and not having a disconnection portion, a first connection electrode connected to a first end of the first branch electrode and a first end of the second branch electrode, and not connected to a first end of the third branch electrode, and a second connection electrode that connects second ends of the first branch electrode, the second branch electrode and the third branch electrode.

2. The display device of claim 1, further comprising a gate line and a data line that are connected to the thin film transistor, wherein the gate line extends in a first direction, the data line extends in a second direction that crosses the first direction, and the branch electrodes extend in two directions that form a predetermined angle with respect to the second direction.

3. The display device of claim 2, wherein the extension direction of the branch electrodes and the second direction form an angle between 5 degrees to 10 degrees.

4. The display device of claim 2, wherein the first direction is a vertical direction, the second direction is a horizontal direction, and the first direction and the second direction perpendicularly cross each other.

5. The display device of claim 2, wherein the branch electrodes are symmetrical to each other with reference to an imaginary line.

6. The display device of claim 5, wherein the imaginary line is parallel with the first direction.

7. The display device of claim 6, wherein the branch electrodes are bent on the imaginary line.

8. The display device of claim 6, wherein the first sub-branch electrode and the second sub-branch electrode are disposed apart from each other on the imaginary line.

9. The display device of claim 2, wherein the roof layer comprises a column portion that covers one of sides of the microcavity, and the column portion extends in the second direction on a plane.

10. The display device of claim 1, wherein the branch electrodes further comprise a fourth branch electrode, a fifth branch electrode, a sixth branch electrode, a seventh branch electrode and an eighth branch electrode, and first ends of the fourth branch electrode, the fifth branch electrode, the sixth branch electrode, the seventh branch electrode, and the eighth branch electrode are not connected with each other.

11. The display device of claim 1, wherein the branch electrodes substantially extend in a same direction as date lines extend, and wherein each of the branch electrodes has a bent portion at a center except a branch electrode which has a shortest distance from an adjacent-data line.

12. The display device of claim 11, wherein the branch electrode which has a shortest distance from an adjacent data line is the first branch electrode.

13. The display device of claim 12, wherein the first sub-branch electrode and the second sub-branch are spaced apart from each other at the center.

14. The display device of claim 10, wherein the second connection electrode further connects second ends of the fourth branch electrode, the fifth branch electrode, the sixth branch electrode, the seventh branch electrode and the eighth branch electrode.

* * * * *